3,320,323
ALKYL SULFUR DERIVATIVES OF POLYALKYL TETRAHYDRONAPHTHALENES AND PROCESS FOR MAKING SAME
Robert Lusskin, Haworth, and Joseph Levy, Paramus, N.J., assignors to Universal Oil Products Company, Des Plaines, Ill., a corporation of Delaware
No Drawing. Filed June 22, 1964, Ser. No. 377,052
12 Claims. (Cl. 260—607)

This invention relates to new compositions of matter and to a process for their preparation. More particularly, this invention relates to alkyl sulfur derivatives of polyalkyltetrahydronaphthalenes.

The alkyl sulfur derivatives of the polyalkyltetrahydronaphthalenes of this invention have the following structural formula:

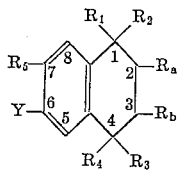

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; and Y is selected from the group consisting of methyl and ethyl-mercapto, -sulfinyl and -sulfonyl radicals. These compounds have properties which make them valuable in many chemical fields. For example, the alkylsulfinyl and alkylsulfonyl substituted polyalkyltetrahydronaphthalenes, besides being useful as intermediates in the preparation of other compounds, have a musk-like odor which makes these compounds extremely useful in the perfume industry. The alkylmercapto substituted polyalkyltetrahydronaphthalenes, while not having musk-like odors, are valuable as chemical intermediates especially, for example, in the preparation of the alkylsulfinyl or alkylsulfonyl substituted polyalkyltetrahydronaphthalenes of this invention.

Compounds having musk-like odors are valuable in perfumery because in addition to their odor, they generally have fixative and blending properties useful in perfume formulating. The most valuable of these compounds are the macrocyclic musks which are organic compounds having 15 to 18 carbon atoms in an alicyclic ring such as muskone, civetone, pentadecanolide, or ethylene brassylate. These macrocyclic compounds, however, are not readily available because they either have to be extracted from not readily available natural sources or must be synthesized by difficult and complicated chemical processes. Accordingly, many types of compounds have been prepared which have musk-like odors as substitutes for the macrocyclic musks. One class of these compounds is known as nitro musks which are relatively easy to prepare and inexpensive, but generally have harsh odors. Another class of these compounds are acylated polyalkyltetrahydronaphthalenes which possess extremely fine musk-like odors. The numerous compounds included within both of these classes generally do not contain sulfur substituents and it is therefore quite surprising that members of the class of new compounds of this invention which contain a sulfur substituent have musk-like odors.

An object of this invention is to provide a new class of compounds consisting of alkyl sulfur derivatives of polyalkyltetrahydronaphthalenes. Another object of this invention is to provide alkylsulfinyl or alkylsulfonyl substituted polyalkyltetrahydronaphthalenes having a musk-like odor. A further object of this invention is to provide a process for preparing alkyl sulfur derivatives of polyalkyltetrahydronaphthalenes.

One embodiment of this invention is a compound having the following structural formula:

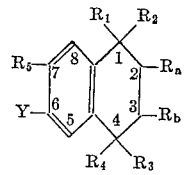

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; and Y is selected from the group consisting of methyl and ethyl -mercapto, -sulfinyl and -sulfonyl radicals.

Another embodiment of this invention is a process for preparing a compound having the following structural formula:

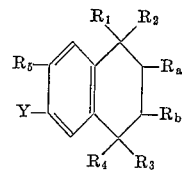

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; and Y is selected from the group consisting of methyl and ethyl -mercapto, -sulfinyl and -sulfonyl radicals; which comprises: (A) reacting a dialkyl-disulfide selected from the group consisting of dimethyldisulfide and diethyldisulfide in the presence of a catalyst with a polyalkyltetrahydronaphthalene having the following formula:

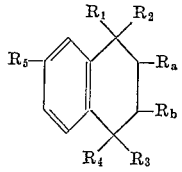

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; (B) reacting the alkylmercapto substituted polyalkyltetrahydronaphthalene thus obtained with an oxidizing agent; and (C) recovering the desired product.

Further objects and embodiments of this invention will appear from a further-detailed description thereof.

As hereinbefore set forth, this invention relates to alkyl sulfur derivatives of polyalkyltetrahydronaphthalenes. Examples of these compounds include 1,1,4,4-tetramethyl-7-ethyl-6-methylsulfonyl - 1,2,3,4 - tetrahydronaphthalene; 1,1,4,4 - tetramethyl-7-ethyl-6-methylsulfinyl-1,2,3,4-tetrahydronaphthalene; 1,1,4,4 - tetramethyl-7-ethyl-6-methylmercapto-1,2,3,4-tetrahydronaphthalene; 1,1,2,4,4,7-hexamethyl-6-methylsulfonyl - 1,2,3,4 - tetrahydronaphthalene; 1,1,2,3,4,4 - hexamethyl - 7 - ethyl-6-ethylsulfonyl-1,2,3,4-tetrahydronaphthalene.

As indicated above, besides having other valuable properties such as being useful as intermediates in the preparation of other compounds, the alkylsulfonyl and alkylsulfinyl substituted polyalkyltetrahydronaphthalenes of this invention possess a musk-like odor which is quite surprising because previously prepared synthetic musk compounds which have musk-like odors generally do not have sulfur-containing substituents.

While the alkylsulfonyl and alkylsulfinyl substituted polyalkyltetrahydronaphthalenes according to this invention can have a maximum of 26 carbon atoms per molecule, the compounds which possess the strongest musk-like odor generally have less than 20 carbon atoms per molecule and preferably from 16 to 17 carbon atoms per molecule, examples of which are 1,1,4,4-tetramethyl-7-ethyl-6-methylsulfonyl-1,2,3,4-tetrahydronaphthalene or 1,1,4,4 - tetramethyl-7-ethyl-6-methylsulfinyl-1,2,3,4-tetrahydronaphthalene.

The new compositions of matter of this invention can be prepared by first forming an alkylmercapto substituted polyalkyltetrahydronaphthalene by reacting a dialkyldisulfide with a polyalkyltetrahydronaphthalene in the presence of a catalyst followed by reacting the alkylmercapto substituted polyalkyltetrahydronaphthalene thus obtained with an oxidizing agent to prepare the alkylsulfinyl or alkylsulfonyl substituted polyalkyltetrahydronaphthalenes.

In reacting the dialkyldisulfide with the polyalkyltetrahydronaphthalene, the dialkyldisulfide used is either dimethyl- or diethyl-disulfide depending upon whether a methyl or ethyl -mercapto, -sulfinyl, or -sulfonyl substituted polyalkyltetrahydronaphthalene is desired. The polyalkyltetrahydronaphthalene used in the reaction has the following structural formula:

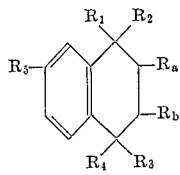

in which $R_1$, $R_2$, $R_3$, $R_4$ and $R_5$ are alkyl radicals selected from the group consisting of methyl and ethyl; and $R_a$ and $R_b$ are selected from the group consisting of hydrogen, methyl and ethyl.

The polyalkyltetrahydronaphthalenes may be prepared by condensing an appropriate alkyl substituted aromatic hydrocarbon such as toluene or ethylbenzene in the presence of a suitable condensing agent such as aluminum chloride with a halo and alkyl substituted aliphatic hydrocarbon such as a 2,5-dichloro-2,5-dialkylhexane derivative, and particularly 2,5-dichloro-2,5-dimethylhexane when a 1,2,3,4-tetrahydronaphthalene having $R_1$, $R_2$, $R_3$ and $R_4$ as methyl is desired. Examples of polyalkyltetrahydronaphthalenes suitable for reaction with the dialkyldisulfide according to this invention include 1,1,4,4-tetramethyl - 7 - ethyl - 1,2,3,4 - tetrahydronaphthalene; 1,1,3,4,4 - pentamethyl-7-ethyl-1,2,3,4-tetrahydronaphthalene; 1,1,2,4,4-pentamethyl-7-ethyl - 1,2,3,4 - tetrahydronaphthalene; 1,1,2,4,4,7-hexamethyl - 1,2,3,4 - tetrahydronaphthalene; or 1,1,2,3,4,4 - hexamethyl-7-ethyl-1,2,3,4-tetrahydronaphthalene.

The conditions utilized in reacting the dialkyl-disulfide with the polyalkyltetrahydronaphthalene are not critical and may be widely varied. Generally, the disulfide and the 1,2,3,4-tetrahydronaphthalene may be reacted in stoichiometric ratios, at temperatures of about 25° C. or higher and for from about 10 to 30 hours or more. The use of a catalyst is, however, necessary in conducting the reaction and generally Friedel-Crafts type catalysts are used. Such catalysts include metal halides such as aluminum-, zinc-, ferric- or stannic-chlorides and are used in an approximately molar equivalent to the moles of 1,2,3,4-tetrahydronaphthalene present.

The alkylmercapto substituted polyalkyltetralin prepared by reacting the dialkyldisulfide with the polyalkyltetrahydronaphthalene is then reacted with an oxidizing agent to prepare the alkylsulfonyl or alkylsulfinyl substituted polyalkyltetrahydronapthalenes. Suitable oxidizing agents for this purpose include hydrogen peroxide, chromic anhydride, perbenzoic acid, or potassium permanganate. The conditions utilized in reacting the alkylmercapto substituted polyalkyltetrahydronaphthalene and the oxidizing agent to produce the alkylsulfinyl or alkylsulfonyl substituted polyalkyltetrahydronaphthalenes are, with the exception of the molar ratio of oxidizing agent to alkylmercapto substituted 1,2,3,4-tetrahydronaphthalene, not critical. The temperature utilized may range from about 20° to 50° C., with room temperatures of about 25° C. being satisfactory.

In conducting the oxidation of the alkylmercapto substituted polyalkyltetrahydronaphthalene, the ratio of oxidizing agent to 1,2,3,4-tetrahydronaphthalene is important because by varying the ratio, either the alkylsulfinyl or the alkylsulfonyl substituted polyalkyltetrahydronaphthalene is obtained. Thus, by utilizing a ratio of from about 1 mole or less of oxidizing agent per mole of 1,2,3,4 tetrahydronaphthalene, the alkylsulfinyl substituted polyalkyltetrahydronaphthalene is obtained, and by utilizing a ratio of about 2 moles or more of oxidizing agent per mole of 1,2,3,4-tetrahydronaphthalene, the alkylsulfonyl substituted polyalkyltetrahydronaphthalene is obtained.

In a preferred manner of conducting the oxidation, a solvent is utilized such as acetone or acetic acid with acetic acid being generally preferred.

The following examples are given to illustrate the compositions of matter and their method of preparation which, however, are not intended to limit the generally broad scope of this invention in strict accordance therewith.

*Example I*

1,1,4,4-tetramethyl - 7 - ethyl-6-methylmercapto-1,2,3,4-tetrahydronapthalene was prepared according to the process of this invention by charging 648 grams (3 moles) of 1,1,4,4-tetramethyl-7-ethyl-1,2,3,4-tetrahydronaphthalene and 266 grams (2 moles) of aluminum chloride to a reaction flask equipped with a thermometer and stirring means. While stirring the mixture at about 25° C., 94 grams (1 mole) of dimethyl disulfide were added to the flask. The stirring was continued for about 17 hours at which time the flask was cooled in an ice bath. Then 500 grams of water and 50 grams of concentrated hydrochloric acid were added over a period of an hour and the stirring continued for about another hour. An emulsion formed and to break up the emulsion, 200 grams of water and 50 grams of hydrochloric acid were added. The contents of the flask thereupon formed an aqueous layer and organic layer. The aqueous layer was separated and any soluble organic material contained therein extracted with about 175 grams of benzene. The benzene extract was combined with the organic layer and washed with water and a 15 percent potassium hydroxide solution. After the benzene was stripped from the washed mixture, it was distilled to recover 87 grams of solids. The solids were recrystallized from ethanol to obtain 67 grams of 1,1,4,4-tetramethyl-7-ethyl-6-methylmercapto-1,2,3,4-tetrahydronapthalene having a melting point of 28.6° to 30.1° C.

*Example II*

1,1,4,4 - tetramethyl - 7 - ethyl-6-methylsulfinyl-1,2,3,4-tetrahydronaphthalene was prepared according to the process of this invention by charging 26.2 grams (0.11 mole) of 1,1,4,4-tetramethyl-7-ethyl-6-methylmercapto-1,2,3,4-tetrahydronaphthalene, 11.7 grams of 30 percent hydrogen peroxide (0.103 mole) and 200 grams of acetone to a reaction flask. The reaction mixture was then maintained at about 25° C. (room temperature) for about 18 hours at which time crystals began to form. After a total time of 5.5 days, the acetone was evaporated, leaving a pink residue. About 200 grams of water were added to the residue and the resulting oil layer was extracted with benzene. The benzene extract was washed with about 100 grams of water and then the benzene was evaporated leaving an oily residue which slowly solidified. This material was recrystallized twice from methanol and once from ethanol to give 0.3 gram of 1,1,4,4-tetramethyl - 7 - ethyl - 6 - methylsulfinyl-1,2,3,4- tetrahydronaphthalene, having a melting point of 218.8° to 219.4° C. Upon standing, this material was found to have a fine, sweet, musky odor.

*Example III*

1,1,4,4-tetramethyl - 7 - ethyl-6-methylsulfonyl-1,2,3,4-tetrahydronaphthalene was prepared according to the process of this invention by charging 26.2 grams (0.11 mole) of 1,1,4,4-tetramethyl-7-ethyl-6-methylmercapto-1,2,3,4-tetrahydronaphthalene, 29.2 grams of 30 percent hydrogen peroxide (0.258 mole) and 500 grams of glacial acetic acid to a reaction flask. The reaction mixture was then maintained at about 25° C. (room temperature) with occasional shaking for about six days. At that time, about 1,000 grams of water were added to the mixture and a solid material precipitated which was filtered and recrystallized from about 140 grams of methanol to recover 19.2 grams of 1,1,4,4-tetramethyl-7-ethyl-6-methylsulfonyl-1,2,3,4-tetrahydronaphthalene having a melting point of 148° to 151° C. Upon standing, this material was found to have a fine, sweet, musky odor.

*Example IV*

1,1,2,4,4,7-hexamethyl - 6 - methylsulfonyl-1,2,3,4-tetrahydronaphthalene is prepared according to the process of this invention by charging 28.2 grams (0.11 mole) of 1,1,2,4,4,7-hexamethyl - 6 - methylmercapto-1,2,3,4-tetrahydronaphthalene, 29.2 grams of 30 percent hydrogen peroxide (0.258 mole) and 500 grams of glacial acetic acid to a reaction flask. The reaction mixture is then maintained at about 25° C. (room temperature) with occasional shaking for about six days. At that time, about 1,000 grams of water are added to the mixture and a solid material precipitates which is filtered and recrystallized from methanol to recover the 1,1,2,4,4,7-hexamethyl-6-methylsulfonyl-1,2,3,4-tetrahydronaphthalene product.

*Example V*

1,1,2,3,4,4 - hexamethyl-7-ethyl-6-ethylsulfonyl-1,2,3,4-tetrahydronaphthalene is prepared according to the process of this invention by charging 33.2 grams (0.11 mole) of 1,1,2,3,4,4-hexamethyl-7-ethyl-6-ethylmercapto-1,2,3,4-tetrahydronaphthalene, 29.2 grams of 30 percent hydrogen peroxide (0.258 mole) and 500 grams of glacial acetic acid to a reaction flask. The reaction mixture is then maintained at about 25° C. (room temperature) with occasional shaking for about six days. At that time, about 1,000 grams of water are added to the mixture and a solid material precipitates which is filtered and recrystallized from methanol to recover the 1,1,2,3,4,4-hexamethyl - 7 - ethyl-6-ethylsulfonyl-1,2,3,4-tetrahydronaphthalene product.

We claim as our invention:
1. A compound having the following structural formula:

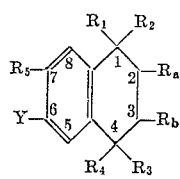

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; and Y is selected from the group consisting of methyl and ethyl -mercapto, -sulfinyl and -sulfonyl radicals.

2. 1,1,4,4 - tetramethyl - 7 - ethyl - 6 - methylsulfonyl-1,2,3,4-tetrahydronaphthalene.

3. 1,1,4,4 - tetramethyl - 7 - ethyl - 6 - methylsulfinyl-1,2,3,4-tetrahydronaphthalene.

4. 1,1,4,4 - tetramethyl - 7 - ethyl - 6 - methylmercapto-1,2,3,4-tetrahydronaphthalene.

5. 1,1,2,4,4,7 - hexamethyl - 6 - methylsulfonyl-1,2,3,4-tetrahydronaphthalene.

6. 1,1,2,3,4,4-hexamethyl - 7 - ethyl - 6 - ethylsulfonyl-1,2,3,4-tetrahydronaphthalene.

7. Process for preparing a compound having the following structural formula:

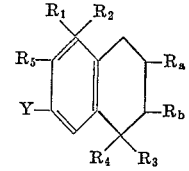

in which $R_1$, $R_2$, $R_3$, $R_4$ and $R_5$ are alkyl radicals selected from the group consisting of methyl and ethyl; $R_a$ and $R_b$ are selected from the group consisting of hydrogen, methyl and ethyl; and Y is selected from the group consisting of methyl and ethyl -mercapto, -sulfinyl and -sulfonyl radicals which comprises: (A) reacting a dialkyldisulfide selected from the group consisting of dimethyldisulfide and diethyldisulfide in the presence of a Friedel-Crafts catalyst with a polyalkyltetrahydronaphthalene having the following formula:

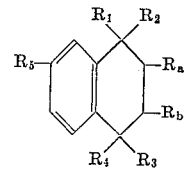

in which $R_1$, $R_2$, $R_3$, $R_4$ and $R_5$ are alkyl radicals selected from the group consisting of methyl and ethyl and $R_a$ and $R_b$ are selected from the group consisting of hydrogen and ethyl to form an alkylmercapto substituted tetrahydronaphthalene; (B) reacting the alkylmercapto substituted tetralin thus obtained with an oxidizing agent to form an alkylsulfonyl or alkylsulfinyl substituted polyalkyl-tetrahydronaphthalene; and (C) recovering the desired product.

8. Process for preparing 1,1,4,4-tetramethyl-7-ethyl-6-methylsulfonyl-1,2,3,4-tetrahydronaphthalene which comprises: (A) reacting dimethyldisulfide with 1,1,4,4-tetramethyl-7-ethyl-1,2,3,4-tetrahydronaphthalene in the presence of a Friedel-Crafts catalyst; (B) reacting the methylmercapto substituted 1,2,3,4-tetrahydronaphthalene thus obtained with hydrogen peroxide in a ratio of at least two moles of peroxide per mole of said substituted 1,2,3,4-tetrahydronaphthalene; and (C) recovering the desired product.

9. Process for preparing 1,1,4,4-tetramethyl-7-ethyl-6-methylsulfinyl-1,2,3,4-tetrahydronaphthalene which comprises: (A) reacting dimethyldisulfide with 1,1,4,4-tetramethyl-7-ethyl-1,2,3,4-tetrahydronaphthalene in the presence of a Friedel-Crafts catalyst; (B) reacting the methylmercapto substituted 1,2,3,4-tetrahydronaphthalene thus obtained with hydrogen peroxide in a ratio of not more than one mole of peroxide per mole of said substituted 1,2,3,4-tetrahydronaphthalene; and (C) recovering the desired product.

10. Process for preparing 1,1,4,4-tetramethyl-7-ethyl-6-methylmercapto - 1,2,3,4 - tetrahydronaphthalene which comprises: (A) reacting dimethyldisulfide with 1,1,4,4-tetramethyl-7-ethyl-1,2,3,4-tetrahydronaphthalene in the presence of a Friedel-Crafts catalyst; and (B) recovering the desired product.

11. Process for preparing 1,1,2,4,4,7 - hexamethyl-6-methylsulfonyl-1,2,3,4-tetrahydronaphthalene which comprises: (A) reacting dimethyldisulfide with 1,1,2,4,4,7-hexamethyl-1,2,3,4-tetrahydronaphthalene in the presence of a Friedel-Crafts catalyst; (B) reacting the methylmercapto substituted 1,2,3,4-tetrahydronaphthalene thus obtained with hydrogen peroxide in a ratio of at least 2 moles of peroxide per mole of said substituted 1,2,3,4-tetrahydronaphthalene; and (C) recovering the desired product.

12. Process for preparing 1,1,2,3,4,4 - hexamethyl-7-ethyl-6-ethylsulfonyl-1,2,3,4-tetrahydronaphthalene which comprises: (A) reacting diethyldisulfide with 1,1,2,3,4,4-hexamethyl-7-ethyl-1,2,3,4-tetrahydronaphthalene in the presence of a Friedel-Crafts catalyst; (B) reacting the ethylmercapto substituted 1,2,3,4-tetrahydronaphthalene thus obtained with hydrogen peroxide in a ratio of at least 2 moles of peroxide per mole of said substituted 1,2,3,4-tetrahydronapthalene; and (C) recovering the desired product.

References Cited by the Examiner

Hahn et al.: Berichte, vol. 56B, p. 2341 (1923).

CHARLES B. PARKER, *Primary Examiner.*

DELBERT R. PHILLIPS, *Assistant Examiner.*